United States Patent
Aramaki et al.

(10) Patent No.: US 11,750,754 B2
(45) Date of Patent: Sep. 5, 2023

(54) IMAGE READING DEVICE CONTROLLING EXPOSURE TIME BY MULTIPLE OPENING AND CLOSING OPERATIONS OF ELECTRONIC SHUTTERS

(71) Applicant: Mitsubishi Electric Corporation, Tokyo (JP)

(72) Inventors: Toru Aramaki, Tokyo (JP); Tomokazu Ogomi, Tokyo (JP); Masatoshi Kodama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 165 days.

(21) Appl. No.: 17/290,256

(22) PCT Filed: Nov. 5, 2019

(86) PCT No.: PCT/JP2019/043231
§ 371 (c)(1),
(2) Date: Apr. 30, 2021

(87) PCT Pub. No.: WO2020/129437
PCT Pub. Date: Jun. 25, 2020

(65) Prior Publication Data
US 2022/0124213 A1  Apr. 21, 2022

(30) Foreign Application Priority Data

Dec. 18, 2018 (JP) .................................. 2018-236393

(51) Int. Cl.
*H04N 1/04* (2006.01)
*H04N 1/00* (2006.01)
(Continued)

(52) U.S. Cl.
CPC ..... *H04N 1/00798* (2013.01); *H04N 1/02835* (2013.01); *H04N 1/19* (2013.01)

(58) Field of Classification Search
None
See application file for complete search history.

(56) References Cited

U.S. PATENT DOCUMENTS 6,501,087 B1    12/2002  Koretsune et al.
7,756,407 B2 *   7/2010  Raskar ............... H04N 5/23258
                                                        348/208.99
(Continued)

FOREIGN PATENT DOCUMENTS

CN    101438318 A    5/2009
CN    104580806 A    4/2015
(Continued)

OTHER PUBLICATIONS

International Search Report and Written Opinion dated Dec. 17, 2019, received for PCT Application PCT/JP2019/043231, Filed on Nov. 5, 2019, 10 pages including English Translation.
(Continued)

*Primary Examiner* — Dung D Tran
(74) *Attorney, Agent, or Firm* — XSENSUS LLP

(57) ABSTRACT

An image reading apparatus (1) includes image sensors (20A, 20B). The image sensor (20A) includes light guides (21A, 22A) guiding light to a reading target (M), a lens body (8A) forming an image of reflected light derived from the light guided by the light guides (21A, 22A) and reflected from the reading target (M), light receiving elements (11A) converting the image of reflected light formed by the lens body (8A) into electrical signals, and a controller (14A) controlling exposure times of the light receiving elements (11A). The image sensor (20B) includes a lens body (8B) forming an image of transmitted light derived from the light guided by the light guide (22A) and transmitted through the reading target (M), light receiving elements (11B) converting the image of transmitted light formed by the lens body (8B) into electrical signals, and a controller (14B) controlling exposure times of the light receiving elements (11B).

9 Claims, 9 Drawing Sheets

(51) Int. Cl.
H04N 1/028 (2006.01)
H04N 1/19 (2006.01)

(56) References Cited

U.S. PATENT DOCUMENTS

| | | | |
|---|---|---|---|
| 2007/0258707 A1* | 11/2007 | Raskar | H04N 5/2329 |
| | | | 348/E5.037 |
| 2015/0249104 A1* | 9/2015 | Ota | G07D 7/12 |
| | | | 250/208.1 |
| 2018/0020123 A1 | 1/2018 | Hayashide | |

FOREIGN PATENT DOCUMENTS

| | | |
|---|---|---|
| JP | 2000-307819 A | 11/2000 |
| JP | 2000-316067 A | 11/2000 |
| JP | 2003-259082 A | 9/2003 |
| JP | 2016-111689 A | 6/2016 |
| WO | 2014/061274 A1 | 4/2014 |

OTHER PUBLICATIONS

Chinese Office Action dated Dec. 26, 2022 in corresponding Chinese Patent Application No. 201980081362.9 (with partial English translation), 13 pages.

* cited by examiner

FIG.8A

| READING PERIOD | | 1 | 2 | 3 | 4 | ... |
|---|---|---|---|---|---|---|
| IMAGE SENSOR 20A | ILLUMINATION TIME | READ TRANSMITTED LIGHT | READ REFLECTED LIGHT | READ TRANSMITTED LIGHT | READ REFLECTED LIGHT | ... |
| | EXPOSURE TIME | | | | | |
| IMAGE SENSOR 20B | ILLUMINATION TIME | READ REFLECTED LIGHT | READ TRANSMITTED LIGHT | READ REFLECTED LIGHT | READ TRANSMITTED LIGHT | ... |
| | EXPOSURE TIME | | | | | |

FIG.8B

| READING PERIOD | | 1 | 2 | 3 | 4 | ... |
|---|---|---|---|---|---|---|
| IMAGE SENSOR 20A | ILLUMINATION TIME | READ TRANSMITTED LIGHT | READ REFLECTED LIGHT | READ TRANSMITTED LIGHT | READ REFLECTED LIGHT | ... |
| | EXPOSURE TIME | | | | | |
| IMAGE SENSOR 20B | ILLUMINATION TIME | READ REFLECTED LIGHT | READ TRANSMITTED LIGHT | READ REFLECTED LIGHT | READ TRANSMITTED LIGHT | ... |
| | EXPOSURE TIME | | | | | |

IMAGE READING DEVICE CONTROLLING EXPOSURE TIME BY MULTIPLE OPENING AND CLOSING OPERATIONS OF ELECTRONIC SHUTTERS

CROSS-REFERENCE TO RELATED APPLICATIONS

The present application is based on PCT filing PCT/JP2019/043231, filed Nov. 5, 2019, which claims priority to JP 2018-236393, filed Dec. 18, 2018, the entire contents of each are incorporated herein by reference.

TECHNICAL FIELD

The present disclosure relates to an image reading apparatus.

BACKGROUND ART

In some existing image reading apparatuses equipped with a pair of image sensors, one of the image sensors receives light reflected from a reading target while the other of the image sensors receives light transmitted through the reading target. For example, Patent Literature 1 discloses an image reading apparatus in which a pair of opposite image sensors receive reflected light and transmitted light, respectively, from a reading target.

CITATION LIST

Patent Literature

Patent Literature 1: International Publication No. WO 2014/061274

SUMMARY OF INVENTION

Technical Problem

In the case where the image sensors emit the same amount of light, the amount of light transmitted through the reading target is smaller than the amount of light reflected from the reading target. Accordingly, in order to obtain the same output level using the same light receiving elements for receiving reflected light and transmitted light, the reading target must be irradiated with a larger amount of light to be transmitted than the amount of light to be reflected. The following description assumes the case where a common light source is used as both the reflected light source and the transmitted light source in the image reading apparatus disclosed in Patent Literature 1. If the amounts of light are determined based on the required amount of reflected light, the output level of transmitted light is lower than the output level of reflected light, resulting in low sensitivity. In contrast, if the amounts of light are determined based on the required amount of transmitted light, the output level of the reflected light is higher than the output level of transmitted light, which may cause saturation.

That is, the output levels of reflected light and transmitted light cannot be equalized in the case where the common light source is used as both the reflected light source and the transmitted light source in the image reading apparatus equipped with the pair of image sensors.

An objective of the disclosure, which has been accomplished in view of the above-described situation, is to equalize the output levels of reflected light and transmitted light from a reading target derived from the light emitted from a common light source, in an image reading apparatus equipped with a pair of image sensors.

Solution to Problem

In order to achieve the above objective, an image reading apparatus according to an aspect of the disclosure is equipped with a first image sensor and a second image sensor. The first image sensor includes a first illuminator, a first lens body, a first light receiving element, and a first controller. The first illuminator emits light to a reading target. The first lens body forms an image of reflected light derived from the light emitted from the first illuminator and reflected from the reading target. The first light receiving element converts the image of reflected light formed by the first lens body into an electrical signal. The first controller controls an exposure time of the first light receiving element. The second image sensor includes a second lens body, a second light receiving element, and a second controller. The second lens body forms an image of transmitted light derived from the light emitted from the first illuminator and transmitted through the reading target. The second light receiving element converts the image of transmitted light formed by the second lens body into an electrical signal. The second controller controls an exposure time of the second light receiving element. The first controller controls the exposure time by multiple opening and closing operations of an electronic shutter of the first light receiving element using pulse driving during a period of reading of reflected light from the reading target. The second controller controls the exposure time by multiple opening and closing operations of an electronic shutter of the second light receiving element using pulse driving during a period of reading of transmitted light from the reading target.

Advantageous Effects of Invention

The image reading apparatus equipped with the pair of image sensors according to the aspect of the disclosure can adjust the amounts of light received in the individual image sensors by controlling the exposure times of the image sensors. This configuration can thus equalize the output levels of reflected light and transmitted light from the reading target derived from the light emitted from the common light source.

BRIEF DESCRIPTION OF DRAWINGS

FIG. 8A illustrates an example of control of the exposure times of light receiving elements according to a first modification;

FIG. 8B illustrates another example of control of the exposure times of the light receiving elements according to the first modification;

DESCRIPTION OF EMBODIMENTS

An image reading apparatus according to embodiments of the disclosure will now be described in detail with reference to the accompanying drawings. In these drawings, the components identical or corresponding to each other are provided with the same reference symbol.

Embodiment 1

Figure 1:
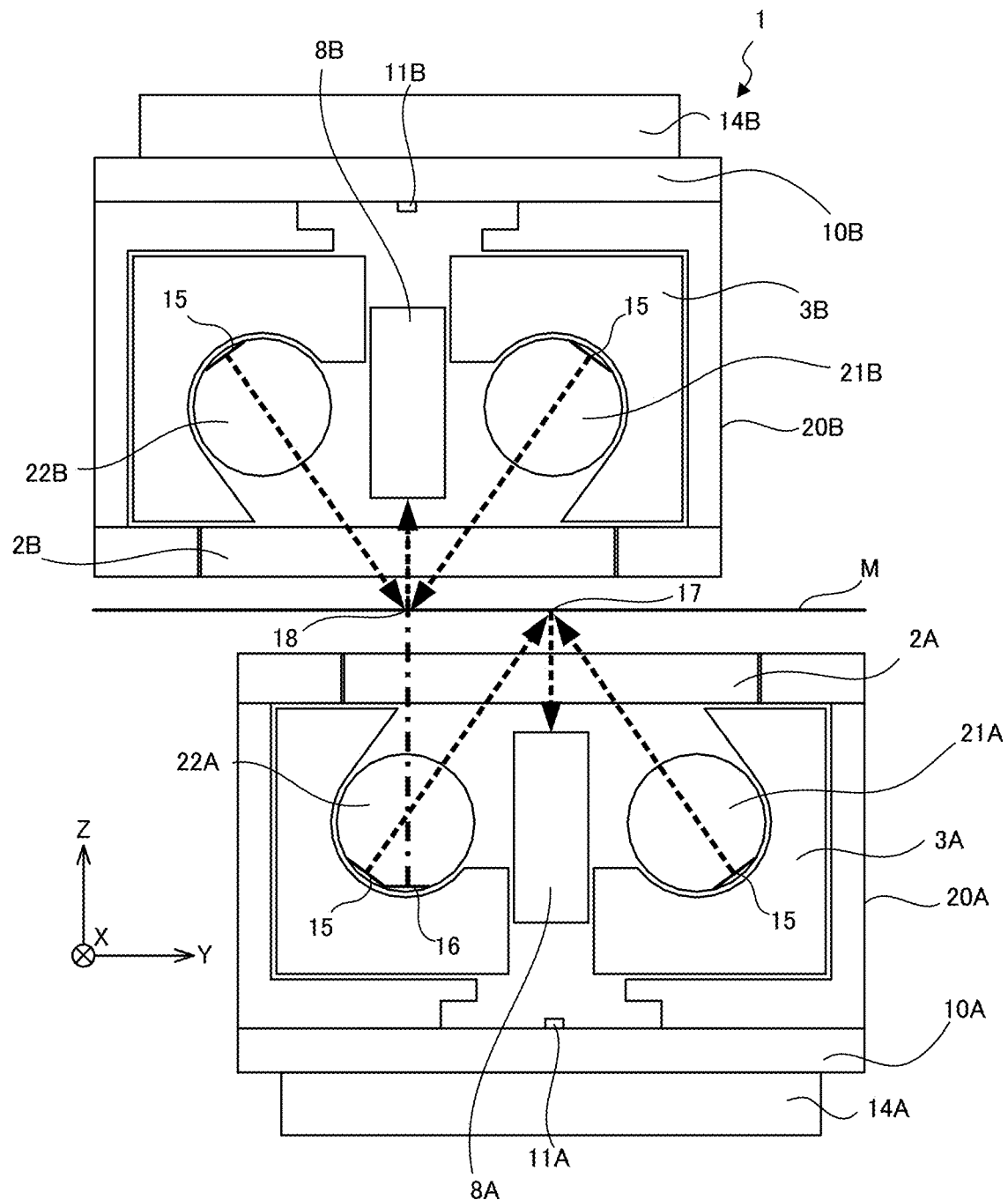
FIG. 1 illustrates a section of an image reading apparatus along the plane extending in the sub-scanning direction according to Embodiment 1 of the disclosure.

FIG. 1 illustrates a section of an image reading apparatus 1 along the plane extending in the sub-scanning direction according to Embodiment 1 of the disclosure. In this drawing, X indicates the main scanning direction of the image reading apparatus 1, Y indicates the sub-scanning direction, and Z indicates the height direction. The image reading apparatus 1 reads an image of a reading target M transported in the sub-scanning direction. Examples of the reading target M include bank notes and securities. The image reading apparatus 1 is equipped with an image sensor 20A and an image sensor 20B. The image sensors 20A and 20B are disposed on the opposite sides of the transport path of the reading target M. The image sensor 20A emits light to a reading position 17 and reads reflected light, which is reflected from one surface of the reading target M. The image sensor 20A also emits light to a reading position 18. The image sensor 20B reads transmitted light, which is emitted from the image sensor 20A to the reading position 18 and transmitted through the reading target M. The image sensor 20B also emits light to the reading position 18 and reads reflected light, which is reflected from the other surface of the reading target M. The image sensor 20A includes common light sources each functioning as both the reflected light sources and the transmitted light sources. The reading positions 17 and 18 are examples of a first reading position and a second reading position, respectively. The image sensors 20A and 20B are examples of a first image sensor and a second image sensor, respectively.

Figure 2:
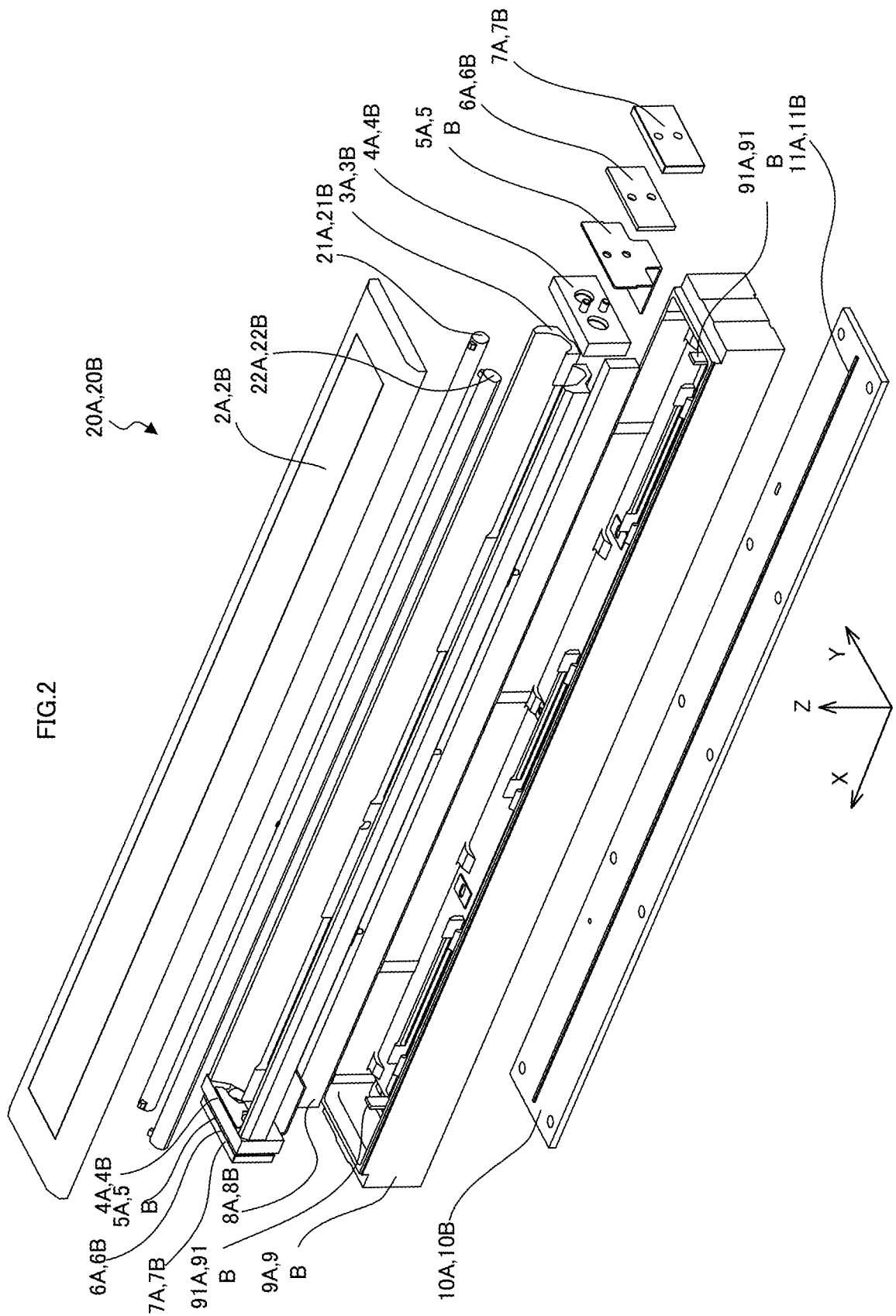
FIG. 2 is an exploded perspective view of an image sensor according to Embodiment 1.

The components of the image sensors 20A and 20B will now be described with reference to FIG. 2. FIG. 2 is an exploded perspective view of the image sensor 20A or 20B according to Embodiment 1. The image sensor 20A includes a transparent plate 2A made of a transparent member, a light guide 21A and a light guide 22A for guiding light to the reading target M, light guide support members 3A for supporting the light guides 21A and 22A, holders 4A attached to the light guides 21A and 22A, light source substrates 5A on which the light sources are mounted, heat conductive sheets 6A for conducting heat from the light sources, heat sinks 7A for discharging heat from the light sources, a lens body 8A for collecting light from the reading target M, a housing 9A having an open upper surface for accommodating components, a sensor substrate 10A disposed on the bottom surface of the housing 9A, and light receiving elements 11A for converting the received light into electrical signals. The light guides 21A and 22A, the light guide support members 3A, the holders 4A, the light source substrates 5A, the heat conductive sheets 6A, the heat sinks 7A, and the lens body 8A are accommodated in the housing 9A.

The light guides 21A and 22A, the light source substrates 5A, the heat conductive sheets 6A, and the heat sinks 7A are coupled to each other by the holders 4A. The light guides 21A and 22A are rod-shaped transparent components made of a resin, for example. Although FIG. 2 illustrates the single light guide 21A and the single light guide 22A, this configuration is a mere example. The configuration may include at least one light guide 21A and at least one light guide 22A, or may include only the light guide 22A. The light guides 21A and 22A are supported by the respective light guide support members 3A. The lens body 8A is supported by a lens body retainer 91A provided to the housing 9A. The transparent plate 2A is disposed on the upper surface of the housing 9A that accommodates the components, and the sensor substrate 10A equipped with the light receiving elements 11A is disposed on the bottom surface of the housing 9A. The light receiving elements 11A are arranged in the main scanning direction X on the sensor substrate 10A. The bottom surface of the housing 9A has an opening having an area larger than the area of the sensor substrate 10A equipped with the light receiving elements 11A. The light receiving elements 11A are thus exposed to the space inside the housing 9A through the opening on the bottom surface. The light receiving elements 11A are arranged in accordance with the optical axis of the lens body 8A and face the lens body 8A.

The image sensor 20B includes the identical components to the above-described components of the image sensor 20A. The image sensor 20B includes a transparent plate 2B, a light guide 21B and a light guide 22B, light guide support members 3B, holders 4B, light source substrates 5B, heat conductive sheets 6B, heat sinks 7B, a lens body 8B, a housing 9B, a sensor substrate 10B, and light receiving elements 11B. The housing 9B is provided with a lens body retainer 91B. Although FIG. 2 illustrates the single light guide 21B and the single light guide 22B, this configuration is a mere example. The configuration may include at least one light guide 21B and at least one light guide 22B, or may include either of the light guides.

Figure 3:
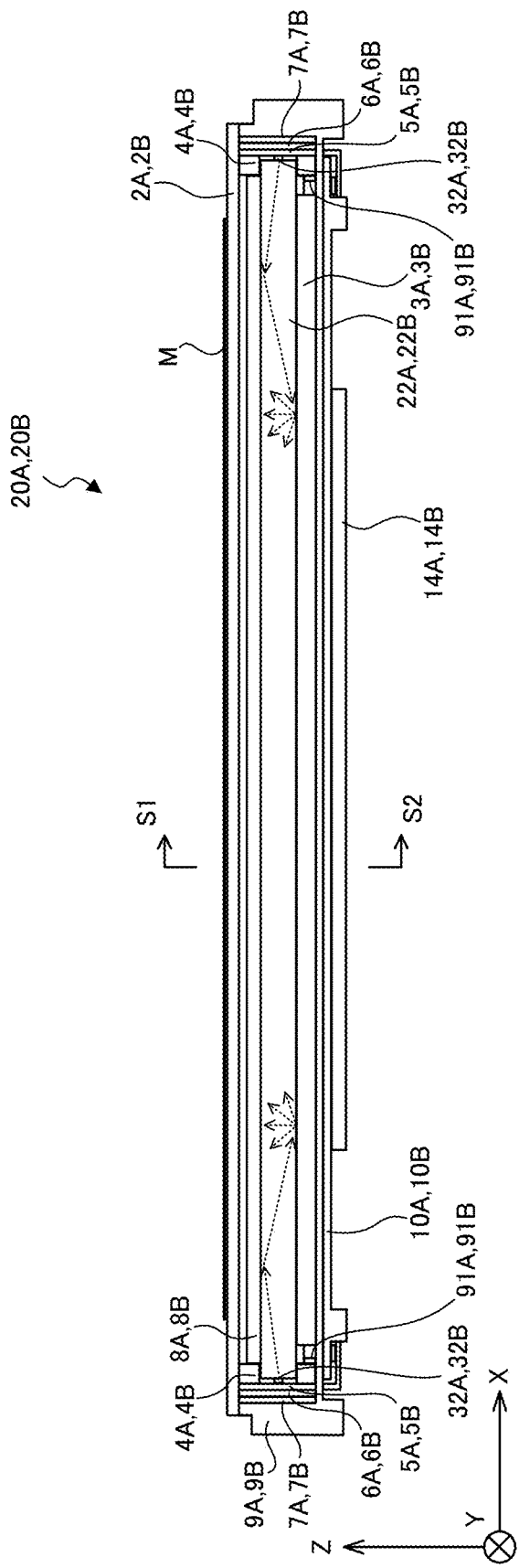
FIG. 3 illustrates a section of the image sensor along the plane extending through one light guide in the main scanning direction according to Embodiment 1.

The components of the image sensors 20A and 20B will now be described with reference to FIGS. 1, 3, and 4. FIG. 3 illustrates a section of the image sensor 20A along the plane extending through the light guide 22A in the main scanning direction, and a section of the image sensor 20B along the plane extending through the light guide 22B in the main scanning direction. The surfaces of the light source substrates 5A of the image sensor 20A that face the light guide 22A are provided with light sources 32A for emitting light. A typical example of the light source 32A is a light emitting diode (LED) chip. The other surfaces of the light source substrates 5A that are opposite to the surfaces provided with the light sources 32A are coupled to the heat conductive sheets 6A and the heat sinks 7A, so as to discharge heat generated during the illumination of the light sources 32A.

The light emitted from the light sources 32A enter the light guide 22A through the end faces thereof. The light incident from the light sources 32A through the end faces of the light guide 22A is reflected inside the light guide 22A and propagates in the longitudinal direction, that is, the main scanning direction. The propagating light is diffused and guided toward the transparent plate 2A in the form of linear light extending in the main scanning direction. This light guided by the light guide 22A reaches the reading positions 17 and 18.

Figure 4:
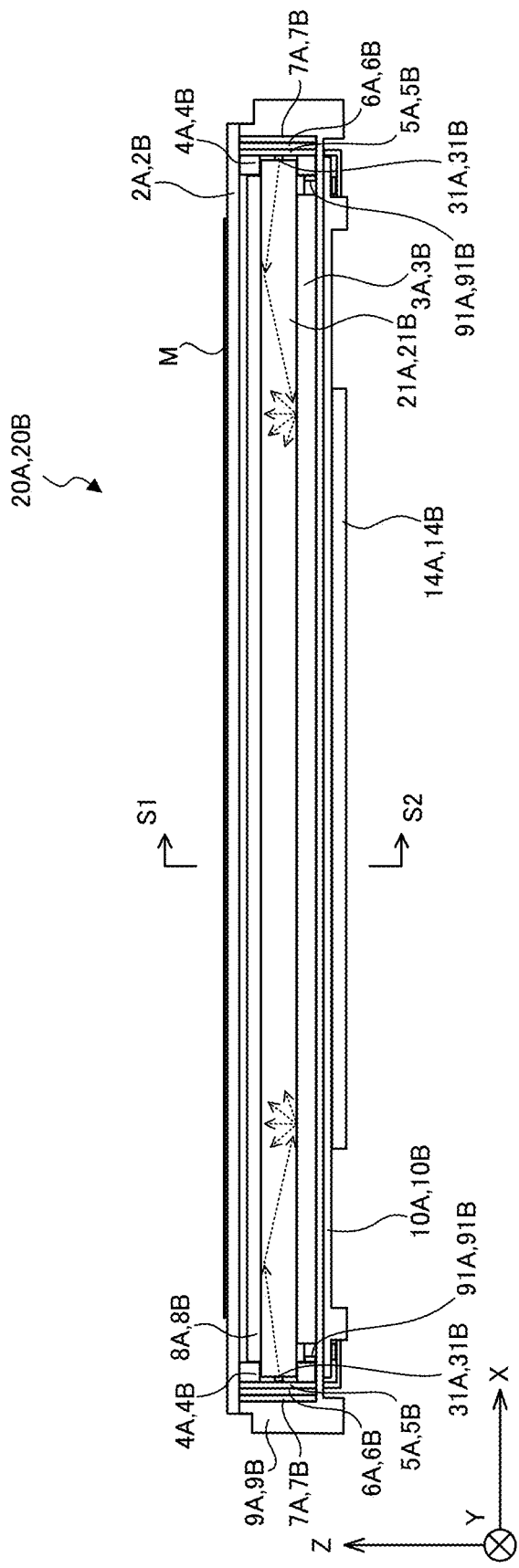
FIG. 4 illustrates a section of the image sensor along the plane extending through the other light guide in the main scanning direction according to Embodiment 1.

FIG. 4 illustrates a section of the image sensor 20A along the plane extending through the light guide 21A in the main scanning direction, and a section of the image sensor 20B along the plane extending through the light guide 21B in the main scanning direction. The surfaces of the light source substrates 5A of the image sensor 20A that face the light guide 21A are provided with light sources 31A for emitting light. The light emitted from the light sources 31A enter the light guide 21A through the end faces thereof. The light incident from the light sources 31A through the end faces of the light guide 21A is reflected inside the light guide 21A and propagates in the main scanning direction. The propagating light is diffused and guided toward the transparent plate 2A in the form of linear light extending in the main scanning direction. This light guided by the light guide 21A reaches the reading position 17.

As described above, the light emitted from the light sources 32A is guided by the light guide 22A to the reading target M at the reading positions 17 and 18. The light emitted from the light sources 31A is guided by the light guide 21A to the reading target M at the reading position 17. The light guides 21A and 22A, the holders 4A, the light source substrates 5A, the heat conductive sheets 6A, the heat sinks 7A, and the light sources 31A and 32A of the image sensor 20A constitute an example of a first illuminator.

As illustrated in FIG. 1, the image sensor 20A irradiates the reading target M with linear light extending in the main scanning direction X during transportation of the reading target M in the sub-scanning direction Y. The reflected light from the reading target M at the reading position 17 enters the lens body 8A including a plurality of lenses arranged in the main scanning direction X. The lens body 8A forms an image of the reflected light from the reading target M on the light receiving elements 11A disposed on the sensor substrate 10A. The lens body 8A and the light receiving elements 11A are examples of a first lens body and a first light receiving element, respectively. The surface of the sensor substrate 10A opposite to the surface provided with the light receiving elements 11A is adjacent to a controller 14A. The light receiving elements 11A convert optical signals of the individual pixels of the image of the reflected light into electrical signals and outputs the signals to the controller 14A. The controller 14A processes the electrical signals input from the light receiving elements 11A and outputs the processed signals to the outside.

The image sensor 20B includes the identical components to the above-described components of the image sensor 20A. As illustrated in FIGS. 3 and 4, the surfaces of the light source substrates 5B of the image sensor 20B that face the light guides 21B and 22B are provided with light sources 31B and 32B for emitting light. The light emitted from the light sources 31B is guided by the light guide 21B to the reading target M at the reading position 18. The light emitted from the light sources 32B is guided by the light guide 22B to the reading target M at the reading position 18. The image sensor 20B does not emit light to the reading position 17. The light guides 21B and 22B, the holders 4B, the light source substrates 5B, the heat conductive sheets 6B, the heat sinks 7B, and the light sources 31B and 32B constitute an example of a second illuminator.

As illustrated in FIG. 1, the image sensor 20B irradiates the reading target M with linear light extending in the main scanning direction X during transportation of the reading target M in the sub-scanning direction Y. The reflected light from the reading target M at the reading position 18 enters the lens body 8B including a plurality of lenses arranged in the main scanning direction X. In the image sensor 20B, the transmitted light from the reading target M at the reading position 18 also enters the lens body 8B. The lens body 8B forms images of the reflected light and transmitted light from the reading target M on the light receiving elements 11B disposed on the sensor substrate 10B. The lens body 8B and the light receiving elements 11B are examples of a second lens body and a second light receiving element, respectively. The surface of the sensor substrate 10B opposite to the surface provided with the light receiving elements 11B is adjacent to a controller 14B. The light receiving elements 11B convert optical signals of the individual pixels of the image of the reflected light and the image of the transmitted light into electrical signals and outputs the signals to the controller 14B. The controller 14B processes the electrical signals input from the light receiving elements 11B and outputs the processed signals to the outside.

As described above, the image sensor 20A reads reflected light, which is emitted from their own light sources 31A and 32A and reflected from one surface of the reading target M. The image sensor 20B reads reflected light, which is emitted from their own light sources 31B and 32B and reflected from the other surface of the reading target M, and also reads transmitted light, which is emitted from the light sources 32A of the image sensor 20A and transmitted through the reading target M. The light guides of the image sensors 20A and 20B will now be described in detail with reference to FIG. 5.

Figure 5A:
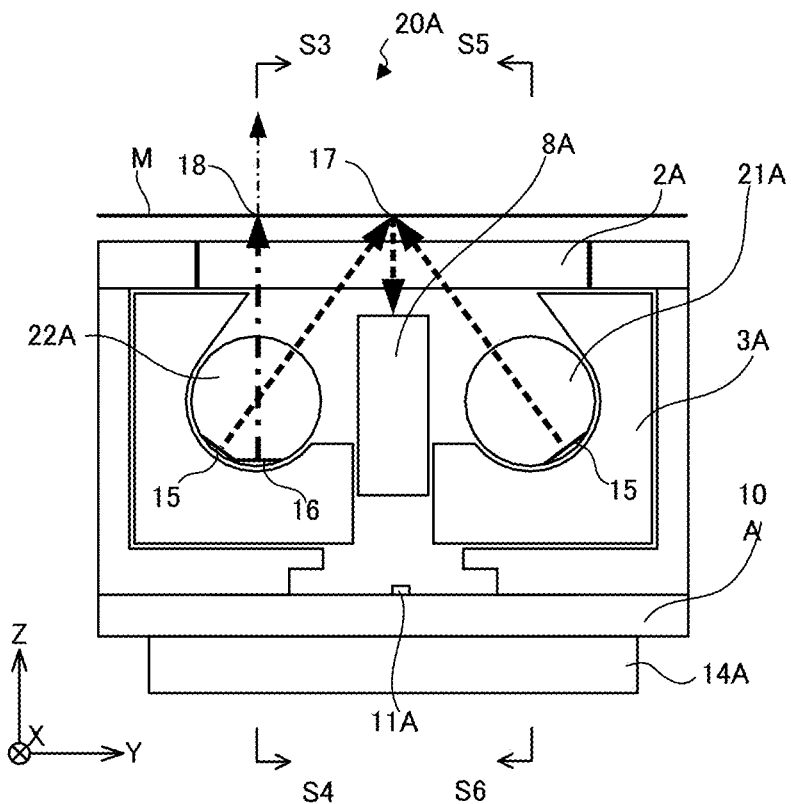
FIG. 5A illustrates a section of one of the image sensors along the plane extending in the sub-scanning direction according to Embodiment 1.

FIG. 5A illustrates a cross section S1-S2 of the image sensor 20A illustrated in FIGS. 3 and 4 along the plane extending in the sub-scanning direction. FIG. 3 illustrates a cross section S3-S4 of the image sensor 20A illustrated in FIG. 5A along the plane extending in the main scanning direction. FIG. 4 illustrates a cross section S5-S6 of the image sensor 20A illustrated in FIG. 5A along the plane extending in the main scanning direction. The light guide 21A irradiates the reading target M with light to be read by the image sensor 20A as reflected light. The light guide 22A irradiates the reading target M with light to be read by the image sensor 20A as reflected light, and also irradiates the reading target M with light to be read by the image sensor 20B as transmitted light. The light guide 21A includes a light scatterer 15. The light guide 22A includes a light scatterer 15 and a light scatterer 16. The light scatterers 15 and 16 have patterns for scattering light by means of white printing or prisms, for example.

The light incident through the end faces of the light guide 21A is reflected inside the light guide 21A and propagates in the main scanning direction. The propagating light is diffused by the light scatterer 15 and is guided toward the transparent plate 2A in the form of linear light extending in the main scanning direction. The light scatterer 15 in the light guide 21A is disposed at the position and the angle so as to cause the reflected light to proceed in a direction diagonal to the normal line direction of the reading target M and reach the reading position 17. Also, the light incident through the end faces of the light guide 22A is reflected inside the light guide 22A and propagates in the main scanning direction. The propagating light is diffused by the light scatterer 15 and is guided toward the transparent plate 2A in the form of linear light extending in the main scanning direction. The light scatterer 15 in the light guide 22A is disposed at the position and the angle so as to cause the reflected light to proceed in a direction diagonal to the normal line direction of the reading target M and reach the reading position 17 from the side of the lens body 8A opposite to the side of the light guide 21A. The light scatterer 15 is an example of a first light reflection pattern. The reflected light from the reading target M at the reading position 17 enters the lens body 8A. The lens body 8A forms an image of the reflected light from the reading target M on the light receiving elements 11A disposed on the sensor substrate 10A. The light receiving elements 11A convert optical signals of the image of the reflected light into electric signals and outputs the signals to the controller 14A. The light reflected inside the light guide 22A and propagating in the main scanning direction is also diffused by the light scatterer 16 and is guided toward the transparent plate 2A in the form of linear light extending in the main scanning direction. The light scatterer 16 in the light guide 22A is disposed at the position and the angle so as to cause the reflected light to proceed in the normal line direction of the reading target M and reach the reading position 18. The light scatterer 16 is an example of a second light reflection pattern.

Figure 5B:
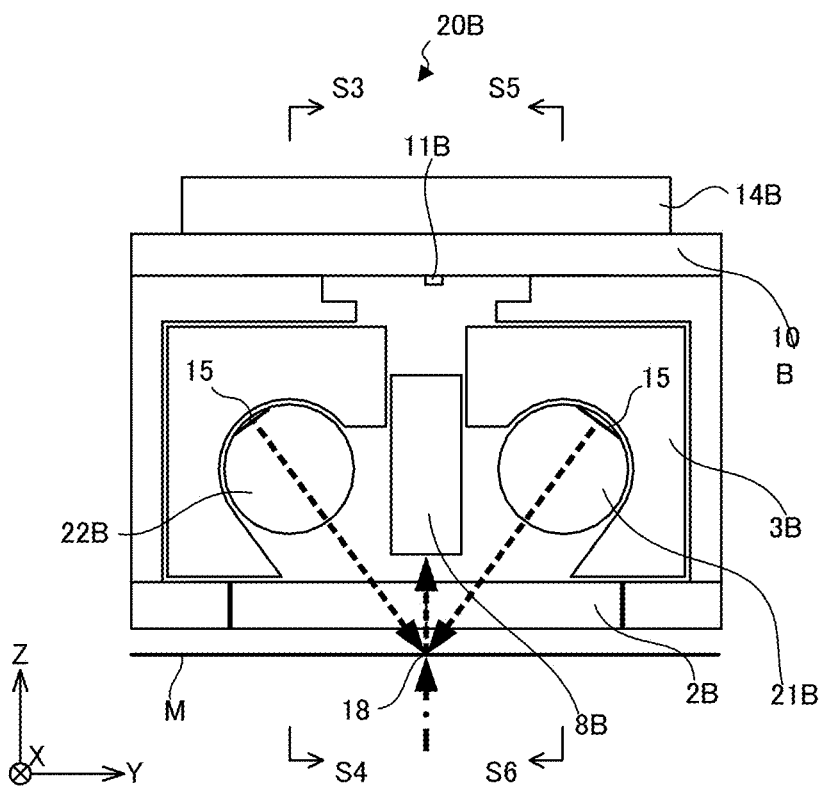
FIG. 5B illustrates a section of the other of the image sensors along the plane extending in the sub-scanning direction according to Embodiment 1.

That is, the light sources 32A provided to face the end faces of the light guide 22A are used as common light sources for emitting light to be read by the image sensor 20A as reflected light and light to be read by the image sensor 20B as transmitted light. FIG. 5B illustrates a cross section S1-S2 of the image sensor 20B illustrated in FIGS. 3 and 4 along the plane extending in the sub-scanning direction. FIG. 3 illustrates a cross section S3-S4 of the image sensor 20B illustrated in FIG. 5B along the plane extending in the main scanning direction. FIG. 4 illustrates a cross section S5-S6 of the image sensor 20B illustrated in FIG. 5B along the plane extending in the main scanning direction. As illustrated in FIG. 5B, each of the light guides 21B and 22B of the image sensor 20B also includes a light scatterer 15. The light guide 22B of the image sensor 20B does not include a light scatterer 16. The light incident through the end faces of the light guide 21B is reflected inside the light guide 21B and propagates in the main scanning direction. The propagating light is diffused by the light scatterer 15 and is guided toward the transparent plate 2B in the form of linear light extending in the main scanning direction. The light scatterer 15 in the light guide 21B is disposed at the position and the angle so as to cause the reflected light to proceed in a direction diagonal to the normal line direction of the reading target M and reach the reading position 18. Also, the light incident through the end faces of the light guide 22B is reflected inside the light guide 22B and propagates in the main scanning direction. The propagating light is diffused by the light scatterer 15 and is guided toward the transparent plate 2B in the form of linear light extending in the main scanning direction. The light scatterer 15 in the light guide 22B is disposed at the position and the angle so as to cause the reflected light to proceed in a direction diagonal to the normal line direction of the reading target M and reach the reading position 18 from the side of the lens body 8B opposite to the side of the light from the light guide 21B.

Each of the controllers 14A and 14B includes a shutter for controlling the exposure time of the light receiving elements 11A or 11B. The exposure time can be controlled using an electronic shutter or a mechanical shutter.

The electronic shutter is a function of sweeping accumulated electric charges during a reading period and accumulating electric charges in the light receiving elements only for a predetermined time. The reading period indicates a time from reading of the initial pixel until reading of the subsequent pixel. The electronic shutter is closed while the light receiving elements are sweeping electric charges and is open while the light receiving elements are accumulating electric charges. The controllers 14A and 14B control driving signals for the electronic shutters and can thereby control the exposure times of the respective light receiving elements 11A and 11B, that is, the periods of accumulation of electric charges.

The mechanical shutter is a shutter disposed between the light receiving elements and the lens body for blocking light. The controllers 14A and 14B open and close the mechanical shutters and thereby control the exposure times of the respective light receiving elements 11A and 11B. The controllers 14A and 14B are examples of a first controller and a second controller, respectively. The control of the exposure times of the light receiving elements 11A and 11B will now be explained with reference to FIG. 6.

Figure 6A:
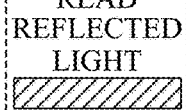
FIG. 6A illustrates an example of control of the exposure times of light receiving elements according to Embodiment 1.

In FIG. 6, the rectangles with diagonal hatching each represent an illumination time of the light sources and the higher segments of rectangular pulses each represent an exposure time. That is, the high and low segments of rectangular pulses correspond to the open and closed states of the shutter, respectively. The transport rate of transporting the reading target M is defined by the reading period and the resolution of the image reading apparatus 1. The transport rate V of the reading target M is represented in $V=1/(P*R)$, where P indicates the reading period and R indicates the resolution. In the example illustrated in FIG. 6A, the light sources 31B and 32B of the image sensor 20B are emitting light during first and third reading periods of reading of reflected light in the image sensor 20B. During the illumination of the light sources 31B and 32B, the controller 14B of the image sensor 20B opens and closes the shutter to expose the light receiving elements 11B only for the time required for reading of reflected light. The light sources 31A and 32A of the image sensor 20A are emitting light during second and fourth reading periods of both of reading of reflected light in the image sensor 20A and reading of transmitted light in the image sensor 20B. During the illumination of the light sources 31A and 32A, the controller 14A of the image sensor 20A opens and closes the shutter to expose the light receiving elements 11A only for the time required for reading of reflected light. At the same time, the controller 14B of the image sensor 20B opens and closes the shutter to expose the light receiving elements 11B only for the time required for reading of transmitted light. Since the exposure times of the light receiving elements 11A for receiving reflected light and the light receiving elements 11B for receiving transmitted light are appropriately controlled, the light receiving elements 11A and 11B can receive the same amount of light, despite of different amounts between the reflected light incident to the image sensor 20A and the transmitted light incident to the image sensor 20B. This configuration can equalize the output levels of reflected light and transmitted light even if the light sources 32A are used as common light sources serving as both the reflected light sources and the transmitted light sources.

With respect to the amounts of light from the light sources 31A, 32A, 31B, and 32B, the light sources 32A of the image sensor 20A are only required to emit light of at least the minimum amount necessary for reading of transmitted light, and the light sources 31A of the image sensor 20A and the light sources 31B and 32B of the image sensor 20B are only required to emit light of at least the minimum amount necessary for reading of reflected light.

Figure 6B:
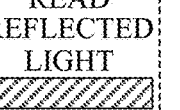
FIG. 6B illustrates another example of control of the exposure times of light receiving elements according to Embodiment 1.

As illustrated in FIG. 6B, the exposure times of the light receiving elements 11A and 11B may also be controlled by multiple opening and closing operations of the shutter using pulse driving during the reading period. The exposure times may also be controlled without the electronic or mechanical shutter.

As described above, the image reading apparatus 1 equipped with the pair of image sensors 20A and 20B according to Embodiment 1 can adjust the amounts of received light by controlling the exposure times of the light receiving elements 11A and 11B. This configuration can equalize the output levels of reflected light and transmitted light, which are emitted from the common light sources 32A through the light guide 22A and reflected from and transmitted through the reading target M.

Embodiment 2

Although the reading position of the image sensor 20A is apart from the reading position of the image sensor 20B in the sub-scanning direction according to Embodiment 1, the reading position of the image sensor 20A coincides with the reading position of the image sensor 20B according to Embodiment 2. The image sensors 20A and 20B have the components and functions identical to those according to Embodiment 1.

Figure 7:
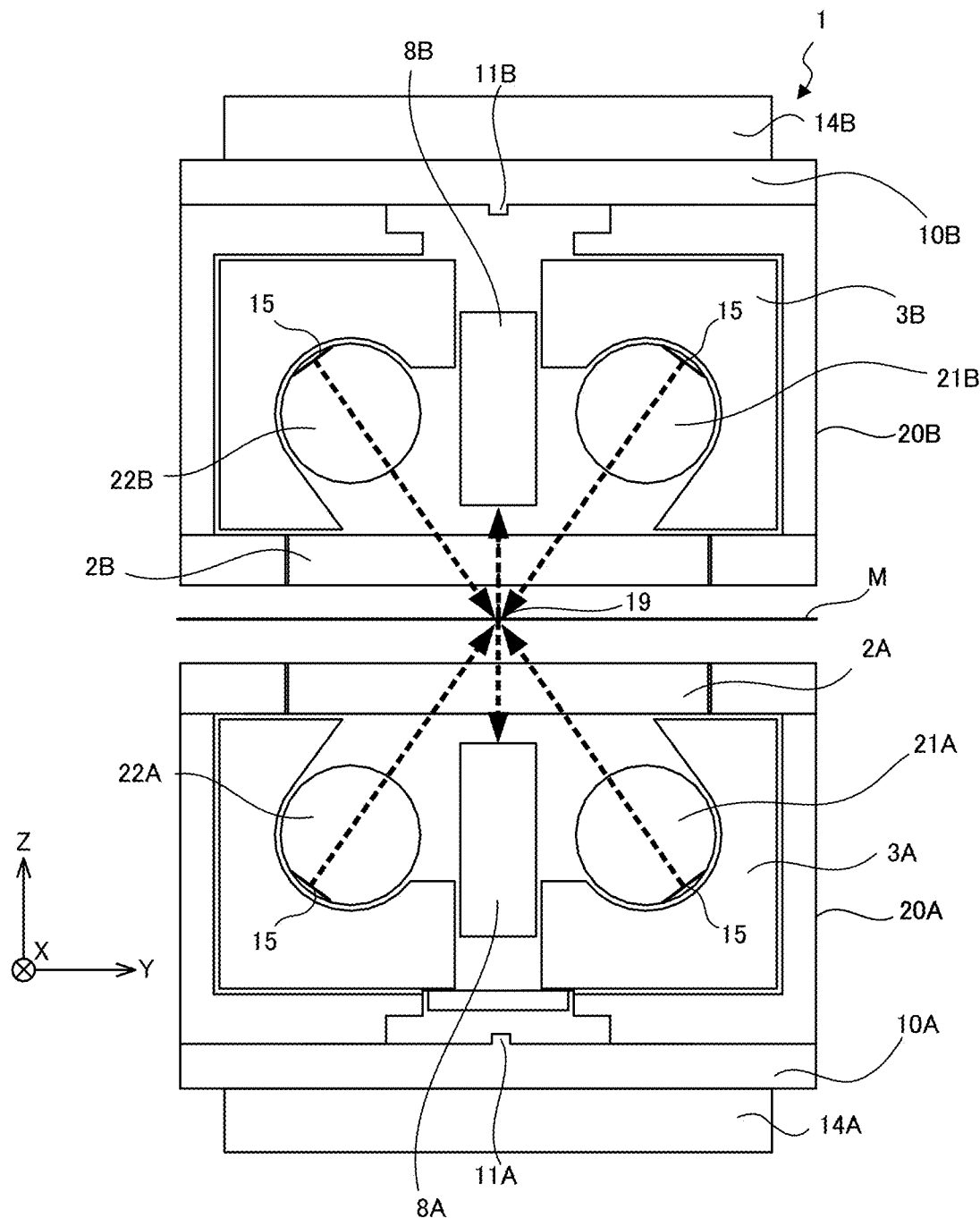
FIG. 7 illustrates a section of an image reading apparatus along the plane extending in the sub-scanning direction according to Embodiment 2 of the disclosure.

FIG. 7 illustrates a section of the image reading apparatus along the plane extending in the sub-scanning direction according to Embodiment 2 of the disclosure. In Embodiment 2, the image sensor 20A emits light to a reading position 19 and reads reflected light, which is reflected from one surface of the reading target M. The image sensor 20B also emits light to the reading position 19 and reads reflected light, which is reflected from the other surface of the reading target M. The image sensor 20B also reads transmitted light, which is emitted from the image sensor 20A to the reading position 19 and transmitted through the reading target M. That is, the light sources 31A and 32A (not shown) of the image sensor 20A serve as both the reflected light sources and the transmitted light sources. The reading position 19 is an example of the first reading position.

In Embodiment 2, the image sensor 20B reads transmitted light, which is emitted from the image sensor 20A to the reading target M in a direction diagonal to the normal line direction of the reading target M and transmitted through the reading target M.

As described above, the reading positions of the image sensors 20A and 20B coincide with each other according to Embodiment 2. This configuration can reduce the size of the image reading apparatus 1.

Although the image sensor 20A reads only the reflected light from the reading target M according to the above embodiments, this configuration is a mere example. According to a first modification, the image sensor 20A may read not only the reflected light from the reading target M but also the transmitted light from the reading target M, like the image sensor 20B. In this case, in the configuration in which the reading position of the image sensor 20A is apart from the reading position of the image sensor 20B in the sub-scanning direction as in Embodiment 1, the light guide 21B further includes a light scatterer 16, which reflects the light incident through the end faces and guides the light to exit in the normal line direction of the reading target M. That is, the light sources 31B serve as both the reflected light sources and the transmitted light sources, like the light sources 32A. In the configuration in which the reading position of the image sensor 20A coincides with the reading position of the image sensor 20B as in Embodiment 2, the image sensor 20A reads transmitted light, which is emitted from the image sensor 20B to the reading target M in a direction diagonal to the normal line direction of the reading target M and transmitted through the reading target M. That is, the light sources 31B and 32B serve as both the reflected light sources and the transmitted light sources, like the light sources 31A and 32A. The control of the exposure times of the light receiving elements 11A and 11B according to the first modification will now be explained with reference to FIG. 8.

In FIG. 8, the rectangles with diagonal hatching each represent an illumination time of the light sources and the higher segments of rectangular pulses each represent an exposure time. That is, the high and low segments of rectangular pulses correspond to the open and closed states of the shutter, respectively. In the example illustrated in FIG. 8A, the light sources 31B and 32B of the image sensor 20B are emitting light during first and third reading periods of both of reading of transmitted light in the image sensor 20A and reading of reflected light in the image sensor 20B. During the illumination of the light sources 31B and 32B, the controller 14B of the image sensor 20B opens and closes the shutter to expose the light receiving elements 11B only for the time required for reading of reflected light. At the same time, the controller 14A of the image sensor 20A opens and closes the shutter to expose the light receiving elements 11A only for the time required for reading of transmitted light. The light sources 31A and 32A of the image sensor 20A are emitting light during second and fourth reading periods of both of reading of reflected light in the image sensor 20A and reading of transmitted light in the image sensor 20B. During the illumination of the light sources 31A and 32A, the controller 14A of the image sensor 20A opens and closes the shutter to expose the light receiving elements 11A only for the time required for reading of reflected light. At the same time, the controller 14B of the image sensor 20B opens and closes the shutter to expose the light receiving elements 11B only for the time required for reading of transmitted light. Since the exposure times of the light receiving elements 11A for receiving reflected light and the light receiving elements 11B for receiving transmitted light are appropriately controlled, the light receiving elements 11A and 11B can receive the same amount of light, despite of different amounts between the reflected light incident to the image sensor 20A and the transmitted light incident to the image sensor 20B. This configuration can equalize the output levels of reflected light and transmitted light even if the light sources 32A and 32B are used as common light sources serving as both the reflected light sources and the transmitted light sources. As illustrated in FIG. 8B, the exposure times of the light receiving elements 11A and 11B may also be controlled by multiple opening and closing operations of the shutter using pulse driving during the reading period.

According to a second modification, the image sensor 20B may read only the transmitted light from the reading target M. In this case, the image sensor 20B should not necessarily include the illuminator including the light sources 31B and 32B and the light guides 21B and 22B. The control of the exposure times of the light receiving elements 11A and 11B according to the second modification will now be explained with reference to FIG. 9.

Figure 9A:
FIG. 9A illustrates an example of control of the exposure times of light receiving elements according to a second modification.
Figure 9B:
FIG. 9B illustrates another example of control of the exposure times of the light receiving elements according to the second modification.

In FIG. 9, the rectangles with diagonal hatching each represent an illumination time of the light sources and the higher segments of rectangular pulses each represent an exposure time. That is, the high and low segments of rectangular pulses correspond to the open and closed states of the shutter, respectively. In the example illustrated in FIG. 9A, the light sources 31A and 32A of the image sensor 20A are emitting light during all the reading periods of both of reading reflected light in the image sensor 20A and reading of transmitted light in the image sensor 20B. During the illumination of the light sources 31A and 32A, the controller 14A of the image sensor 20A opens and closes the shutter to expose the light receiving elements 11A only for the time required for reading of reflected light. At the same time, the controller 14B of the image sensor 20B opens and closes the shutter to expose the light receiving elements 11B only for the time required for reading of transmitted light. Since the exposure times of the light receiving elements 11A for receiving reflected light and the light receiving elements 11B for receiving transmitted light are appropriately controlled, the light receiving elements 11A and 11B can receive the same amount of light, despite of different amounts between the reflected light incident to the image sensor 20A and the transmitted light incident to the image sensor 20B. This configuration can equalize the output levels of reflected light and transmitted light even if the light sources 32A are used as common light sources serving as both the reflected light sources and the transmitted light sources. As illustrated in FIG. 9B, the exposure times of the light receiving elements 11A and 11B may also be controlled by multiple opening and closing operations of the shutter using pulse driving during the reading period.

Although both of the controller 14A of the image sensor 20A and the controller 14B of the image sensor 20B control the exposure times according to the above embodiments, this configuration is a mere example. The controller 14B should not necessarily include the shutter for controlling the exposure times, if the amounts of light emitted from the light sources 32A, 31B, and 32B are adjusted to always achieve the maximum exposure time in the image sensor 20B in each reading period as in the example illustrated in FIG. 6A.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-236393, filed on Dec. 18, 2018, the entire disclosure of which is incorporated by reference herein.

REFERENCE SIGNS LIST

1 Image reading apparatus
2A, 2B Transparent plate
3A, 3B Light guide support member
4A, 4B Holder
5A, 5B Light source substrate
6A, 6B Heat conductive sheet
7A, 7B Heat sink
8A, 8B Lens body
9A, 9B Housing
10A, 10B Sensor substrate
11A, 11B Light receiving element
14A, 14B Controller
15, 16 Light scatterer
17, 18, 19 Reading position
20A, 20B Image sensor
21A, 21B, 22A, 22B Light guide
31A, 31B, 32A, 32B Light source
91A, 91B Lens body retainer
M Reading target
X Main scanning direction
Y Sub-scanning direction
Z Height direction

The invention claimed is:

1. An image reading apparatus comprising:
a first image sensor including
a first illuminator to emit light to a reading target,
a first lens body to form an image of reflected light derived from the light emitted from the first illuminator and reflected from the reading target,
a first light receiving element to convert the image of reflected light formed by the first lens body into an electrical signal, and
a first controller to control an exposure time of the first light receiving element; and
a second image sensor including
a second lens body to form an image of transmitted light derived from the light emitted from the first illuminator and transmitted through the reading target,
a second light receiving element to convert the image of transmitted light formed by the second lens body into an electrical signal, and
a second controller to control an exposure time of the second light receiving element, wherein
the first controller controls the exposure time by multiple opening and closing operations of an electronic shutter of the first light receiving element using pulse driving during a period of reading of reflected light from the reading target,
the second controller controls the exposure time by multiple opening and closing operations of an electronic shutter of the second light receiving element using pulse driving during a period of reading of transmitted light from the reading target, and
the first controller and the second controller control the multiple opening and closing operations of the electronic shutters of the first and second light receiving elements, respectively, such that the first light receiving element and the second light receiving element receive a same amount of light.

2. The image reading apparatus according to claim 1, wherein
the second image sensor further includes a second illuminator for emitting light to the reading target while the first illuminator stops emitting light to the reading target, and
the second lens body also forms an image of reflected light derived from the light emitted from the second illuminator and reflected from the reading target.

3. The image reading apparatus according to claim 2, wherein the first lens body also forms an image of transmitted light derived from the light emitted from the second illuminator and transmitted through the reading target.

4. The image reading apparatus according to claim 3, wherein the first illuminator includes
  a rod-shaped light guide extending in a main scanning direction, and
  a light source provided to face an end face of the light guide in the main scanning direction, the light source emitting light through the end face of the light guide,
the light guide includes
  a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through, and
  a second light reflection pattern for reflecting and scattering the light incident through the end face of the light guide, causing the light to propagate in the main scanning direction, and guiding the light to exit the light guide in the normal line direction of the reading target and reach a second reading position apart from the first reading position in a sub-scanning direction,
the first lens body forms an image of reflected light from the reading target at the first reading position, and
the second lens body forms is an image of transmitted light from the reading target at the second reading position.

5. The image reading apparatus according to claim 3, wherein the first illuminator includes
  a rod-shaped light guide extending in a main scanning direction, and
  a light source provided to face an end face of the light guide in the main scanning direction, the light source emitting light through the end face of the light guide,
the light guide includes a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through,
the first lens body forms an image of reflected light from the first reading position, and
the second lens body forms an image of transmitted light from the first reading position.

6. The image reading apparatus according to claim 2, wherein the first illuminator includes
  a rod-shaped light guide extending in a main scanning direction, and
  a light source provided to face an end face of the light guide in the main scanning direction, the light source emitting light through the end face of the light guide,
  the light guide includes
  a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through, and
  a second light reflection pattern for reflecting and scattering the light incident through the end face of the light guide, causing the light to propagate in the main scanning direction, and guiding the light to exit the light guide in the normal line direction of the reading target and reach a second reading position apart from the first reading position in a sub-scanning direction,
the first lens body forms an image of reflected light from the reading target at the first reading position, and
the second lens body forms an image of transmitted light from the reading target at the second reading position.

7. The image reading apparatus according to claim 2, wherein the first illuminator includes
  a rod-shaped light guide extending in a main scanning direction, and
  a light source provided to face an end face of the light guide in the main scanning direction, the light source emitting light through the end face of the light guide,
the light guide includes a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through,
the first lens body forms an image of reflected light from the first reading position, and
the second lens body forms an image of transmitted light from the first reading position.

8. The image reading apparatus according to claim 1, wherein the first illuminator includes
  a rod-shaped light guide extending in a main scanning direction, and
  a light source provided to face an end face of the light guide in the main scanning direction, the light source emitting light through the end face of the light guide,
  the light guide includes
  a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through, and
  a second light reflection pattern for reflecting and scattering the light incident through the end face of the light guide, causing the light to propagate in the main scanning direction, and guiding the light to exit the light guide in the normal line direction of the reading target and reach a second reading position apart from the first reading position in a sub-scanning direction,
the first lens body forms an image of reflected light from the reading target at the first reading position, and
the second lens body forms an image of transmitted light from the reading target at the second reading position.

9. The image reading apparatus according to claim 1, wherein
the first illuminator includes
a rod-shaped light guide extending in a main scanning direction, and
a light source provided to face an end face of the light guide in the main scanning direction, the light source emitting light through the end face of the light guide,
the light guide includes a first light reflection pattern for reflecting and scattering the light incident through the end face of the light guide, causing the light to propagate in the main scanning direction, and guiding the light to exit the light guide in a direction diagonal to a normal line direction of the reading target and reach a first reading position where the reading target passes through,
the first lens body forms an image of reflected light from the first reading position, and
the second lens body forms an image of transmitted light from the first reading position.

* * * * *